(12) United States Patent (10) Patent No.: US 8,355,247 B2
Senatori et al. (45) Date of Patent: Jan. 15, 2013

(54) SCREW LOCK ASSEMBLY FOR A PORTABLE COMPUTING DEVICE

(75) Inventors: Mark David Senatori, The Woodlands, TX (US); Peter M. On, Houston, TX (US); William Gralewski, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 12/917,005

(22) Filed: Nov. 1, 2010

(65) Prior Publication Data

US 2012/0106076 A1 May 3, 2012

(51) Int. Cl.
*G06F 1/16* (2006.01)
(52) U.S. Cl. ............... 361/679.55; 340/309.2; 345/905; 62/504
(58) Field of Classification Search ........... 83/52, 651.1, 83/438, 508, 614; 296/37.8, 146.16, 190.1, 296/26.09, 101; 340/426.24, 309.2; 361/679.55, 361/679.22, 679.14, 679.09, 679.1, 679.42, 361/679.56, 679.35, 679.39; 345/107, 905; 49/352, 348, 212, 360; 62/132, 135, 196.2, 62/504, 344
See application file for complete search history.

(56) References Cited

U.S. PATENT DOCUMENTS

| 6,038,897 | A | 3/2000 | Dawson et al. |
| 6,435,587 | B1* | 8/2002 | Flowerday et al. .......... 296/37.8 |
| 6,619,894 | B2 | 9/2003 | Hathcock et al. |
| 6,744,622 | B2 | 6/2004 | Lee et al. |
| 7,474,535 | B2 | 1/2009 | Chi et al. |
| 7,697,271 | B2 | 4/2010 | Kuo et al. |
| 2010/0079285 | A1 | 4/2010 | Fawcett et al. |
| 2012/0000333 | A1* | 1/2012 | Hatcher et al. .................... 83/52 |

* cited by examiner

*Primary Examiner* — Hung Duong
(74) *Attorney, Agent, or Firm* — Romiwa C. Akpala

(57) ABSTRACT

Embodiments of the present invention disclose a screw lock assembly for a portable computing device. According to one example embodiment, the portable computing device includes a housing and a removable panel configured to attach to a portion of the housing. A screw lock assembly is coupled to the housing and includes pinion gear configured to mate with a rotatable screw attached to the removable panel. Furthermore, the removable panel is releasably attached to the housing via mating of the rotatable screw and pinion gear.

20 Claims, 4 Drawing Sheets

SCREW LOCK ASSEMBLY FOR A PORTABLE COMPUTING DEVICE

BACKGROUND

Portable computers have become commonplace in today's mobile society and have seemingly supplanted traditional desktop computers as the preferred work and home computer. Laptop or notebook computers, netbooks, and tablet personal computers are a few examples of portable computers that permeate the current marketplace. These mobile workstations typically employ a clam-shell type design and come in a variety of sizes and features. However, one main drawback of these portable computers is that, due to the size and configuration of components, relatively little can be done to easily change or upgrade the computer from its original design.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 3A-3B are three-dimensional and top-down views of a rotatable screw, while

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment.

Servicing or upgrading the internal data processing components of a portable computer is often time-consuming for skilled computer technicians, and a daunting and cumbersome task for ordinary users. Furthermore, as the number portable computers continue to increase, so does the demand to provide custom or personalized housings for each individual user of these devices. Again, the customizable option should be capable of simple insertion and removal so that any user, regardless of technical know-how, can confidently and efficiently perform such a task. Prior solutions have used stickers or thin cosmetic films that can be placed over an existing surface, but these films deteriorate greatly over time and are still unable to provide service access to components within the housing.

Examples of the present invention provide a screw lock assembly for a portable computing device. According to one embodiment, the screw lock assembly is configured to securely fix a removable panel to a housing of the portable computing device. The screw lock assembly includes a movable gear rack and pinion gear for engaging a rotatable screw attached to the removable panel. As such, the screw lock assembly enables a panel cover, keyboard deck, bottom service door or any other cosmetically visible part of the housing to be removed by the end user without any external tools and then replaced with a different panel (e.g., custom-colored or graphic panel).

Several advantages are afforded by the screw lock assembly in accordance with examples of the present invention. For example, the screw lock system allows for customization of the notebook, either at the manufacturing level or by the end user, through a relatively simple installation and removal technique for a desired cosmetic panel. Furthermore, the screw lock assembly eliminates the need for exposed standard screws or other fasteners typically required for accessing the internals of the portable computer, thereby providing quick and direct access to serviceable components. Still further, the screw lock assembly operates as a proprietary system thus allowing for a keyed attachment of the removable panel to the portable computer. More particularly, the rotatable screw and locking gear includes a non-standard or unique threading profile so as to prevent unauthorized parts from being attached to the portable computing device via the screw lock assembly.

Figure 1A:
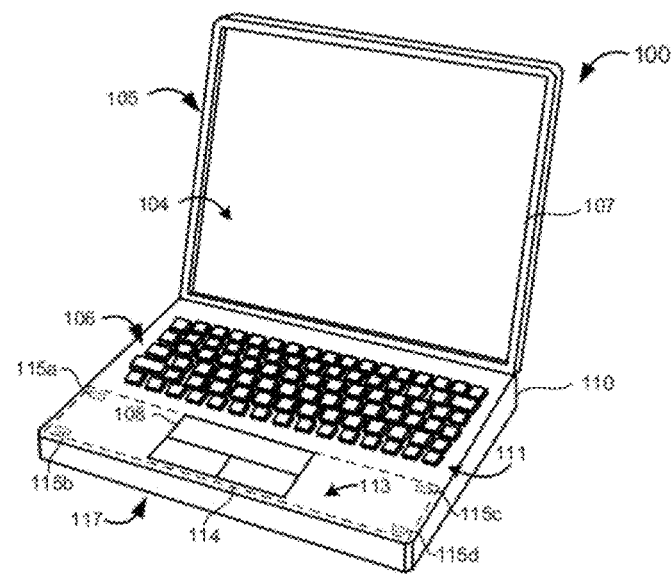
FIGS. 1A-1C are three-dimensional perspective views of a portable computing device according to an example of the present invention.
Figure 1B:
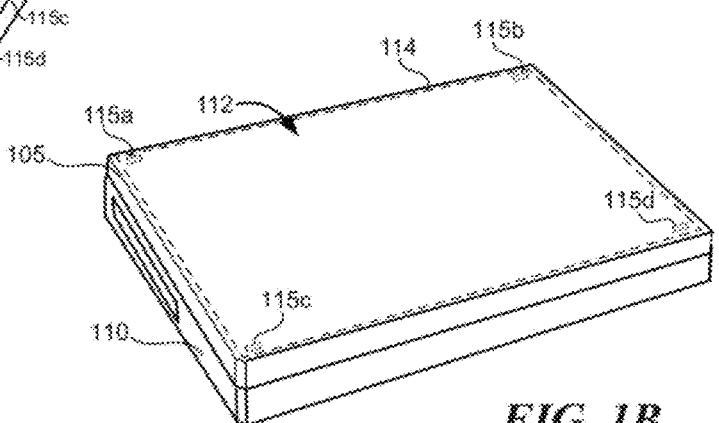
Figure 1C:
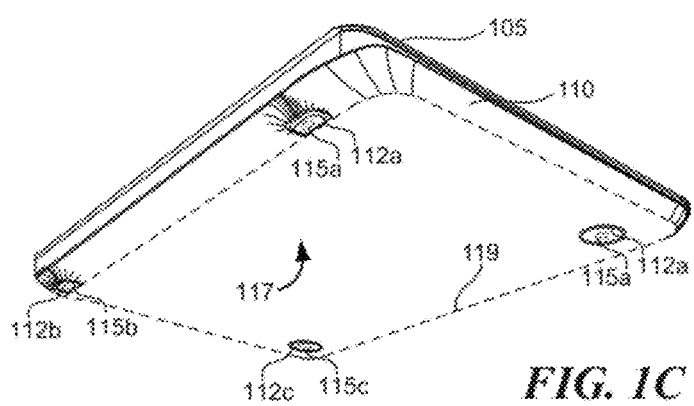

Referring now in more detail to the drawings in which like numerals identify corresponding parts throughout the views, FIGS. 1A-1C are three-dimensional perspective views of a portable computing device according to an example of the present invention. As shown in FIG. 1A, the portable computing device 100 represents the mobile electronic device and includes an upper housing 105 and a base housing 110. The upper housing, or display panel housing 105, includes a display device 107 having electrical wiring adapted to provide graphical display to a user on its front surface side 104. Furthermore, the base housing 110 includes a top surface side 111 and bottom surface side 117 that is opposite the top surface 113. According to one embodiment, the top surface 111 of the base housing 110 may include user input mechanisms such as a keyboard 106 and touch pad 108, and a keyboard deck area 113. Furthermore, a removable panel 114 may be positioned on the keyboard deck area 113 and fixed to the base housing via screw lock assemblies 115a-115d as will be described in further detail with reference to FIGS. 4A-4C.

FIG. 1B is a three-dimensional view of the portable computer in a closed position. As shown here, the base housing 110 and display panel housing 105 are in a closed position in which the display panel housing 105 is vertically-adjacent and substantially aligned with the base housing 110. In particular, the front surface side 104 of the display panel housing 105 covers the front surface side (side opposite bottom surface 117) of the base housing 110 including the keyboard 106 and touchpad 108. According to one example, a removable panel (top cover) 114 is formed on a rear surface side 112 (opposite front surface side 104 shown in FIG. 1A) of the display housing 105. Similar to the previous example, the removable panel 114 or top cover is positioned and fixed onto the rear surface side 112 of the display housing 105 via the screw locking assemblies 115a-115d.

FIG. 1C is a perspective view of a bottom surface 117 of the base housing 110 according to an example of the present invention. Here, a removable panel (i.e. bottom cover panel or access door) 119 is positioned on the bottom surface side 117 of the housing so as to protect the battery and other processing components of the portable computer. As shown in this example embodiment, removable panel 114 (access door) is attached to the base housing 110 through a mating feature afforded by screw locking assemblies 115a-115d. In accordance with one example, rubber pads 112a-112d may each be utilized to cover a portion of a respective screw lock assembly 115a-115 in order to provide a more cosmetically appealing design.

Figure 2:
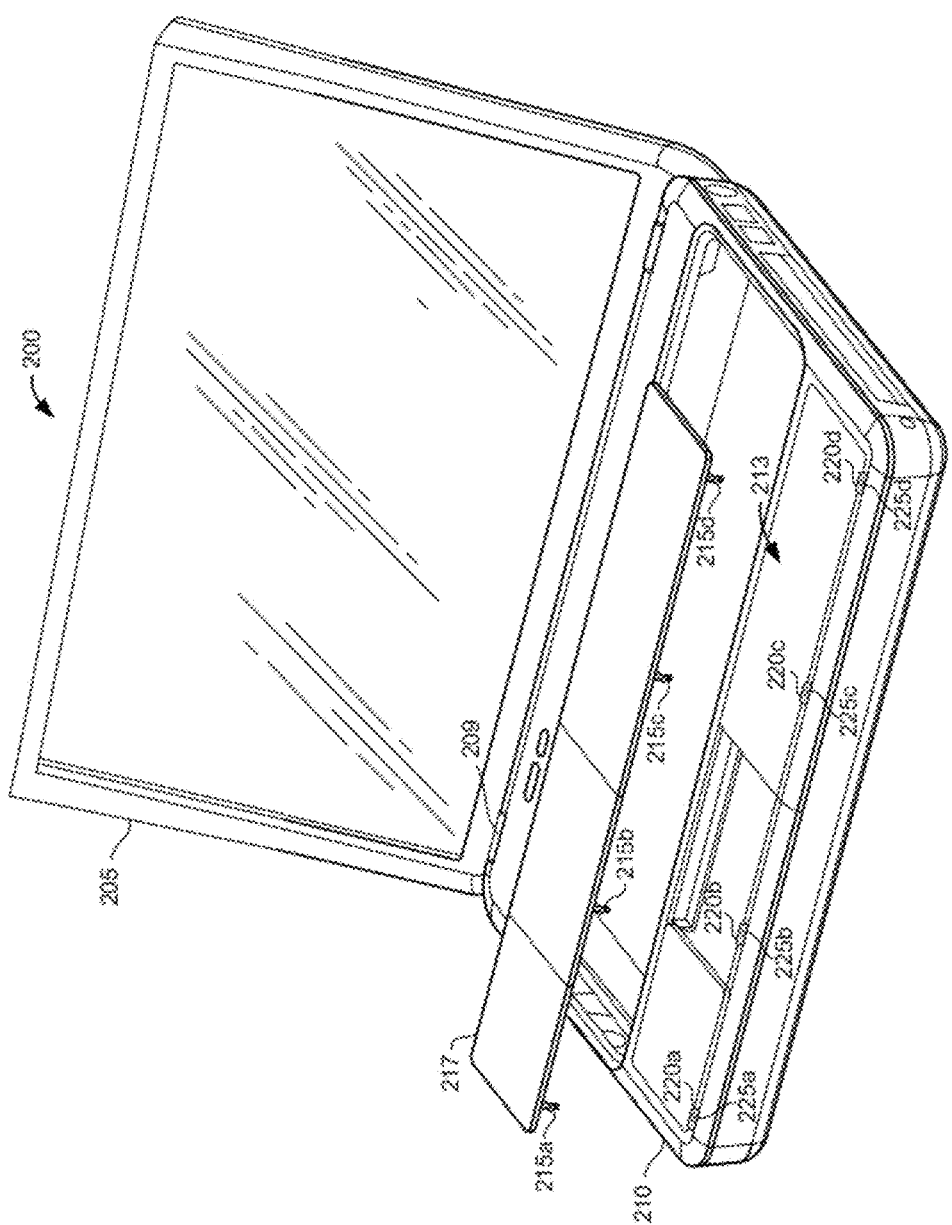
FIG. 2 is a three-dimensional perspective view of a portable computing device and removable panel according to an example of the present invention.

FIG. 2 is a three-dimensional perspective view of a portable computing device and removable panel according to an example of the present invention. In the present example, the portable computing device 200 includes an upper housing 205 pivotally connected to a base housing 210 via a hinge mechanism 209. As shown here, the base housing 210 includes a plurality of screw locking assemblies 220a-220d. Moreover, each screw locking assembly 220a-220d includes a corresponding aperture 225a-225d. In accordance with one example of the invention, removable panel 214 represents a keyboard rest panel to be positioned over and attached to the keyboard rest area 213 of the base housing 210. The removable panel 214 includes a plurality of rotatable screws 215a-215d. Additionally, each rotatable screw 215a-215d includes a threading portion for mating with a corresponding screw lock assembly 215a-215d as will be described in further detail with reference to FIGS. 3A-3D. As such, the removable panel 212 may be placed on top of the keyboard rest area 213 and attached thereto via the plurality of rotatable screws 215a-215d and plurality of screw locking assemblies 220a-220d. Although a keyboard panel is depicted as the removable cover panel, embodiments of the present invention are not limited thereto, and the removable cover panel may any represent any cosmetically visible part of either the display housing 205 (e.g. top cover panel) or the base housing (e.g. bottom cover panel or access door).

Figure 3A:
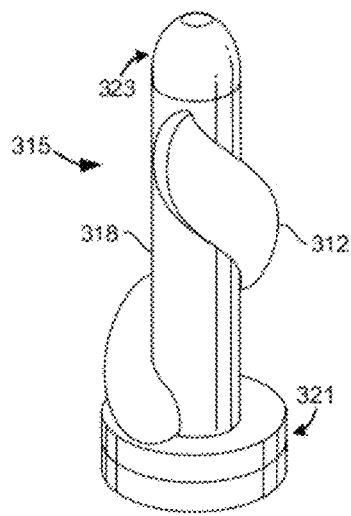
Figure 3B:
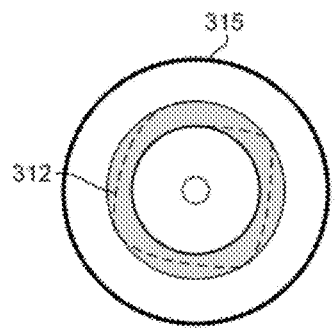
Figure 3C:
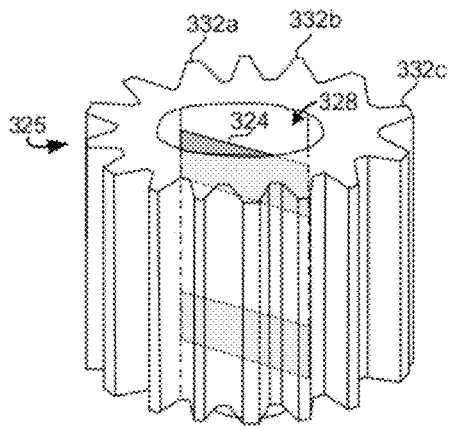
FIGS. 3C-3D are three-dimensional and top-down views of the locking gear according to an example of the present invention.
Figure 3D:
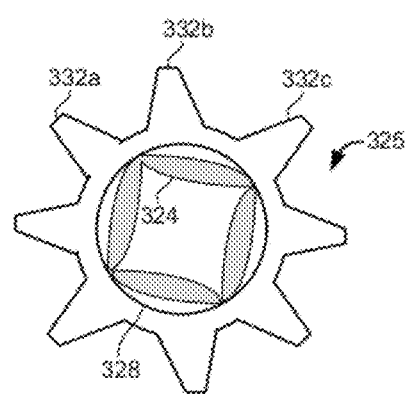

FIGS. 3A and 3B are three-dimensional and top-down views of rotatable screw, while FIGS. 3C and 3D are three-dimensional and top-down views of the locking gear according to an example of the present invention. As shown in the example embodiments of the FIGS. 3A and 3B, the rotatable screw 315 includes an elongated portion 318 extending upright from a wide base area 321 of the rotatable screw 315 to a narrow tip area 323 of the rotatable screw 315. Furthermore, the rotatable screw 315 includes a distinct and unique threading portion 312 that forms a helix, which wraps around the elongated portion 318 for enabling the rotatable screw to mate with the locking gear 325 depicted in FIGS. 3C and 3D. More particularly, the distinct threading portion 312 has a non-standard thread pitch (i.e. unique helix design around the elongated portion 318) conducive to the attachment feature of examples of the present invention.

As shown in FIGS. 3C and 3D, locking gear 325 includes an aperture 328 and an internal engaging or mating portion 324 formed within the aperture 328. The engaging or mating portion 324 has a non-standard thread pitch that corresponds with the unique threading portion 312 of the rotatable screw 315 shown in FIGS. 3A and 3B. In one example, the locking gear 325 represents a pinion gear having a plurality of teeth 332a-332c. According to one example embodiment of the present invention, upon moving the rotatable screw 315 in close proximity to the locking gear 325, the mating portion 324 of the locking gear 325 is configured to engage the threading portion 312 and feed the rotatable screw 315 through the aperture 328 of the locking gear 325 when the teeth of the locking gear 325 are rotated clockwise or counterclockwise as will be described in further detail below.

Figure 4A:
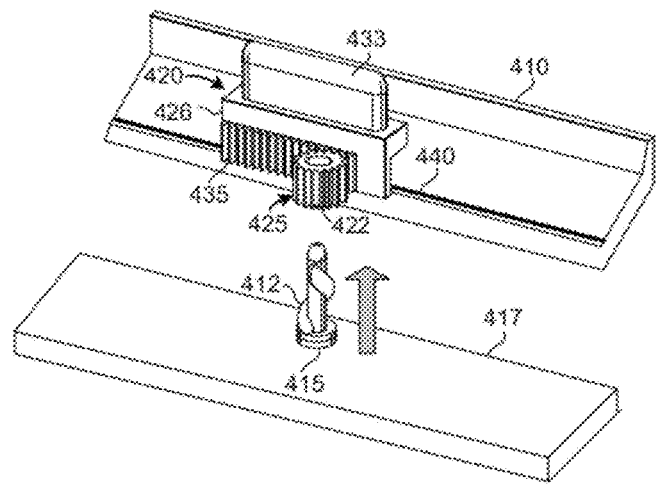
FIGS. 4A-4C illustrates the attaching feature of the screw lock assembly according to an example of the present invention.
Figure 4B:
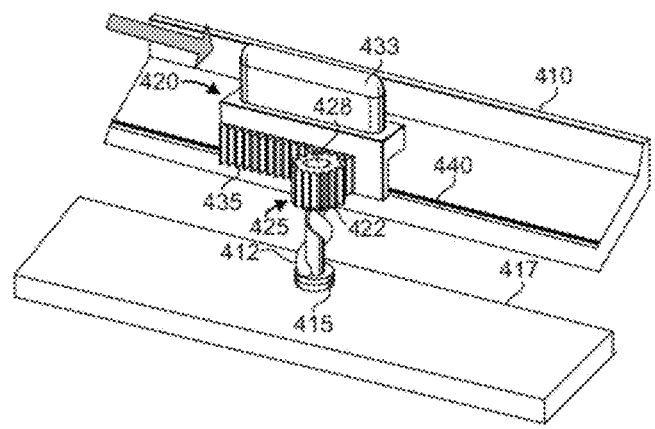
Figure 4C:
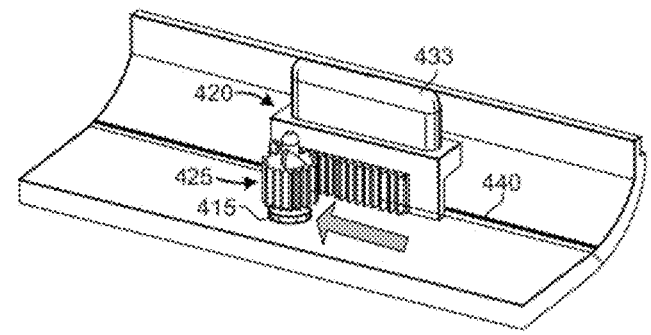

FIGS. 4A-4C illustrates the attaching mechanism of the screw lock assembly according to an example of the present invention. FIG. 4A depicts the rotatable screw 415 being inserted into a screw lock assembly 420 in accordance with an example of the present invention. The screw lock assembly includes a movable member 426, a locking gear 425, an engaging surface 435, and a gripping or tab portion 433.

According to one example, the movable member 426 is configured to slide along a guide track 440 associated with the housing 410 that the removable panel 417 is to be fixed onto. The engaging surface 435 is configured to engage the outer area 425 of the locking gear 422. Here, the engaging surface 435 of the movable member 426 represents a linear gear rack having teeth that corresponds to the teeth formed along the outer area 425 of the pinion gear 422.

As shown in FIG. 4B, the rotatable screw 415 is brought within close proximity of the aperture 428 of the locking gear 425. At this point, the user may push the tab portion 433 of the movable member 426 laterally as indicated by the shaded arrow. In one example, the user may access the tab portion 433 from a remote location on the portable computing device that makes the tab portion 433 less visually obtrusive. For instance, the tab portion 433 may be accessible from the bottom of the portable computer or from within an existing access door or battery compartment. Alternatively, the tab portion 433 may be positioned on a visible surface of the portable computing device, but disguised as a feature such as a rubber panel bumper or the like. When the rotatable screw 415 is in close proximity to the aperture 428 of the locking gear 425 as shown in FIG. 4B, the unique threading portion 412 of the rotatable screw 415 engages an area of the mating portion of the locking gear 422 to begin the feed-through and attachment mechanism of the present examples.

As shown in the example of FIG. 4C, upon receiving pressure on the tab portion 433 from the user, the moveable member 426 slides laterally (e.g., rightward) along the guide track 440 of the associated housing 410. This movement also causes the teeth 425 of the locking gear 425 to move along the gear track of the engaging surface 435 as indicated by the shaded arrow, which in turn activates clockwise rotation of the locking gear 422. Such action further causes the rotatable screw 415 to feed through the aperture 428 of the locking gear 425 via the distinct threading portion 412 of the rotatable screw 415 and the corresponding mating portion of the locking gear 425 as described above. The coupling features of the threading portion 412 of the rotatable screw and the mating portion of the locking gear provides a secure attachment mechanism, thus enabling the removable panel 417 to be securely fixed to the housing 410 as shown in the example embodiment of FIG. 4C.

Examples of the present invention provide a screw lock assembly configured to securely fix a removable panel to a housing of the portable computing device. According to one example, attachment of the removable panel to the housing is accomplished via a movable gear rack and pinion gear that engages a rotatable screw. Moreover, a number of improvements are provided by the screw lock assembly in accordance with examples of the present invention. For instance, the attaching feature afforded by the screw lock assembly provides a simple access means to serviceable components of the portable computing device. Additionally, the distinct and unique mating features of the screw lock assembly allow for a keyed-type (i.e., only authorized parts) attachment of the removable panel to the portable computer.

Furthermore, while the invention has been described with respect to exemplary embodiments, one skilled in the art will recognize that numerous modifications are possible. For example, although exemplary embodiments depict a notebook computer as the portable computer, the invention is not limited thereto. For example, the portable computer may be a ultraportable computer such as a netbook or smartbook, a mobile internet device such as a tablet personal computer, a mobile phone such as a smartphone, or any other electronic computing device having at least one housing and customizable panels formed thereon.

Still further, though the rotatable screw is described as being a separate element form the screw lock assembly, the rotatable screw may also be considered as an element or component of the screw lock assembly. As such, the screw lock assembly may include the rotatable screw, movable member, tab portion, and pinion gear. Thus, although the invention has been described with respect to exemplary embodiments, it will be appreciated that the invention is intended to cover all modifications and equivalents within the scope of the following claims.

What is claimed is:

1. A portable computing device comprising:
   at least one housing;
   a removable panel configured to attach to a portion of the housing and including a rotatable screw; and
   a screw lock assembly coupled to the housing and including a pinion gear, wherein the pinion gear is configured to mate with the rotatable screw,
   wherein the removable panel is releasably attached to the housing via mating of the rotatable screw and pinion gear.

2. The portable computing device of claim 1, wherein the removable cover is configured to attach and release from the housing without the use of external tools.

3. The portable computing device of claim 1, wherein the at least one housing includes a guide track portion, and
   wherein the screw lock assembly is configured to move horizontally along the guide track portion of the housing.

4. The portable computing device of claim 3, wherein the screw lock assembly includes a gear rack and tab portion, and
   wherein the pinion gear is configured to move along an engaging surface of the gear rack of the screw lock assembly.

5. The portable computing device of claim 4, wherein the rotatable screw includes an elongated shaft having a non-standard threading portion, and
   wherein the locking gear includes an aperture and internal mating feature that corresponds with the non-standard threading portion of the rotatable screw.

6. The portable computing device of claim 5, wherein when the threading portion of rotatable screw is in close proximity to the aperture of the locking gear, the removable panel is attached to the housing by moving the tab portion of the screw lock assembly so as to cause the screw lock assembly to slide along the gear rack and the pinion gear to rotate along the engaging surface of the gear rack.

7. The portable computing device of claim 4, wherein the pinion gear includes teeth formed on an outer area thereof and configured to engage with corresponding teeth formed on the engaging surface of the gear rack.

8. The screw lock assembly of claim 7, wherein the removable cover Is configured to attach and release from the housing without the use of external tools.

9. The screw lock assembly of claim 7, wherein the removable cover is a top cover panel associated with the housing, a keyboard deck panel associated with the housing, or a bottom cover panel associated with the housing.

10. The screw lock assembly of claim 7, wherein the pinion gear includes teeth formed on an outer area thereof and configured to engage with corresponding teeth formed on the first surface of the movable member.

11. The screw lock assembly of claim 10, wherein the rotatable screw includes an elongated shaft including a non-standard threading portion, and
    wherein the pinion gear includes an aperture for receiving the elongated shaft of the rotatable screw and an internal engaging portion that corresponds with non-standard threading portion.

12. The screw lock assembly of claim 11, wherein when the threading portion of the rotatable screw is in close proximity to the aperture of the pinion gear, the removable panel is attached to the housing by laterally moving the gripping portion of the movable member so as to cause the movable member to slide along the guide track and the pinion gear to rotate along the first surface of the movable member.

13. The portable computing device of claim 1, wherein the removable cover is a top cover panel associated with the housing, a keyboard deck panel associated with the housing, or a bottom cover panel associated with the housing.

14. The portable computing device of claim 1, wherein the removable panel includes a plurality of rotatable screws and the housing includes a plurality of screw lock assemblies for facilitating attachment of the removable panel to the housing.

15. A screw lock assembly for a portable computer having a housing and removable panel, the assembly comprising:
    a rotatable screw attached to the removable panel of the portable computer;
    a movable member including a gripping portion and configured to slide along a guide track of the housing; and
    a pinion gear configured to mate with the rotatable screw and move along a first surface of the movable member;
    wherein the removable panel is releasably attached to a portion of the to housing via mating of the rotatable screw with the pinion gear.

16. A portable computer comprising:
    a base housing pivotably connected to an upper housing, wherein either the base housing or the upper housing includes a guide track portion;
    a removable panel configured to attach to a portion of the housing and including a rotatable screw, wherein the rotatable screw includes an elongated shaft having a non-standard threading portion, and
    a screw lock assembly coupled to the housing and including a pinion gear, a gear rack, and a tab portion, wherein the screw lock assembly is configured to move laterally along the guide track portion of the housing,
    wherein the pinion gear includes an aperture and mating portion for receiving the threading portion of the rotatable screw,
    wherein the pinion gear is configured to move along an engaging surface of the gear rack of the screw lock assembly, and
    wherein the removable panel is releasably attached to the housing via mating of the rotatable screw and pinion gear.

17. The portable computer of claim 16, wherein the removable cover Is configured to attach and release from the housing without the use of external tools.

18. The portable computer of claim 16, wherein the pinion gear includes teeth formed on an outer area thereof and configured to engage with corresponding teeth formed on the engaging surface of the gear rack.

19. The portable computer of claim 18, wherein when the threading portion of rotatable screw is in close proximity to the aperture of the pinion gear, the removable panel is attached to the housing by lateral movement of the tab portion of the screw lock assembly so as to cause the screw lock assembly to slide along the guide track and the pinion gear to rotate along the gear rack.

20. The portable computer of claim 16, wherein the removable cover is a top cover panel associated with the upper housing, a keyboard deck panel associated with the base housing, or a bottom cover panel associated with the base housing.

* * * * *

UNITED STATES PATENT AND TRADEMARK OFFICE
CERTIFICATE OF CORRECTION

PATENT NO. : 8,355,247 B2
APPLICATION NO. : 12/917005
DATED : January 15, 2013
INVENTOR(S) : Mark David Senatori et al.

Page 1 of 1

It is certified that error appears in the above-identified patent and that said Letters Patent is hereby corrected as shown below:

In column 5, line 50, in Claim 8, delete "Is" and insert -- is --, therefor.

In column 6, line 24, in Claim 15, after "the" delete "to".

In column 6, line 47, in Claim 17, delete "Is" and insert -- is --, therefor.

Signed and Sealed this
Ninth Day of April, 2013

Teresa Stanek Rea
*Acting Director of the United States Patent and Trademark Office*